United States Patent
Ioki et al.

[11] Patent Number: 5,940,592
[45] Date of Patent: Aug. 17, 1999

[54] COMMUNICATION PROCESSING METHOD IN PARALLEL COMPUTER AND SYSTEM THEREFOR

[75] Inventors: Nobuhiro Ioki, Ebina; Mototugu Yaginuma, Yokohama, both of Japan

[73] Assignees: Hitachi, Ltd., Tokyo; Hitachi Software Engineering Co., Ltd., Yokohama, both of Japan

[21] Appl. No.: 08/606,796

[22] Filed: Feb. 26, 1996

[30] Foreign Application Priority Data

Mar. 3, 1995 [JP] Japan .................................. 7-043832

[51] Int. Cl.⁶ .................................................. G06F 15/16
[52] U.S. Cl. ........................ 395/200.3; 395/841; 395/853
[58] Field of Search ............... 395/800.1, 800.2, 395/200.3, 200.7, 200.53, 200.67, 200.83, 200.5, 200.45, 200.62, 841, 853, 854, 200.21, 800.228, 800.01, 800.11, 800.21; 364/130, 131

[56] References Cited

U.S. PATENT DOCUMENTS

| | | |
|---|---|---|
| 4,318,173 | 3/1982 | Freedman et al. ...................... 395/673 |
| 5,010,477 | 4/1991 | Omoda et al. ...................... 395/800.04 |
| 5,138,704 | 8/1992 | Takahashi et al. .................. 395/800.2 |
| 5,155,857 | 10/1992 | Kunisaki et al. ................... 395/200.53 |
| 5,418,915 | 5/1995 | Matuda et al. ...................... 395/800.22 |
| 5,432,915 | 7/1995 | Jippo .................................. 395/200.59 |
| 5,511,221 | 4/1996 | Kaneko ............................... 395/200.3 |
| 5,517,662 | 5/1996 | Coleman et al. ................... 395/200.31 |
| 5,592,680 | 1/1997 | Utsumi et al. ........................... 395/180 |
| 5,623,689 | 4/1997 | Kaneko ............................... 395/800.11 |
| 5,671,430 | 9/1997 | Gunzinger .......................... 395/800.28 |
| 5,745,779 | 4/1998 | Katori ................................. 395/800.01 |

*Primary Examiner*—James P. Trammell
*Assistant Examiner*—Demetra R. Smith
*Attorney, Agent, or Firm*—Antonelli, Terry, Stout & Kraus, LLP

[57] ABSTRACT

In a distributed memory parallel computer system, each processor unit has a communication status managing table for managing a status as to other processor units to which data transmission is authorized, and a data transmitting processor unit starts the data transmission after it has confirmed that a data receiving processor unit is ready to receive the data, and the receiving processor unit informs the readiness of data reception by updating the communication status managing table of the transmitting processor unit.

6 Claims, 10 Drawing Sheets

FIG.4

| 402 | PU NUMBER | 0 | 1 | 2 | 3 | 4 | 5 | 6 | 7 |
|---|---|---|---|---|---|---|---|---|---|
| 403 | TRANSMISSION AUTHORIZATION INFORMATION | 0 | 0 | 0 | 0 | 0 | 0 | 0 | 0 |
| 404 | DESTINATION STORAGE LOCATION | NULL | NULL | NULL | NULL | NULL | NULL | NULL | NULL |

401

COMMUNICATION STATUS MANAGING TABLE

405
TRANSMISSION AUTHORIZATION INFORMATION
0 : TRANSMISSION NOT AUTHORIZED
1 : TRANSMISSION AUTHORIZED

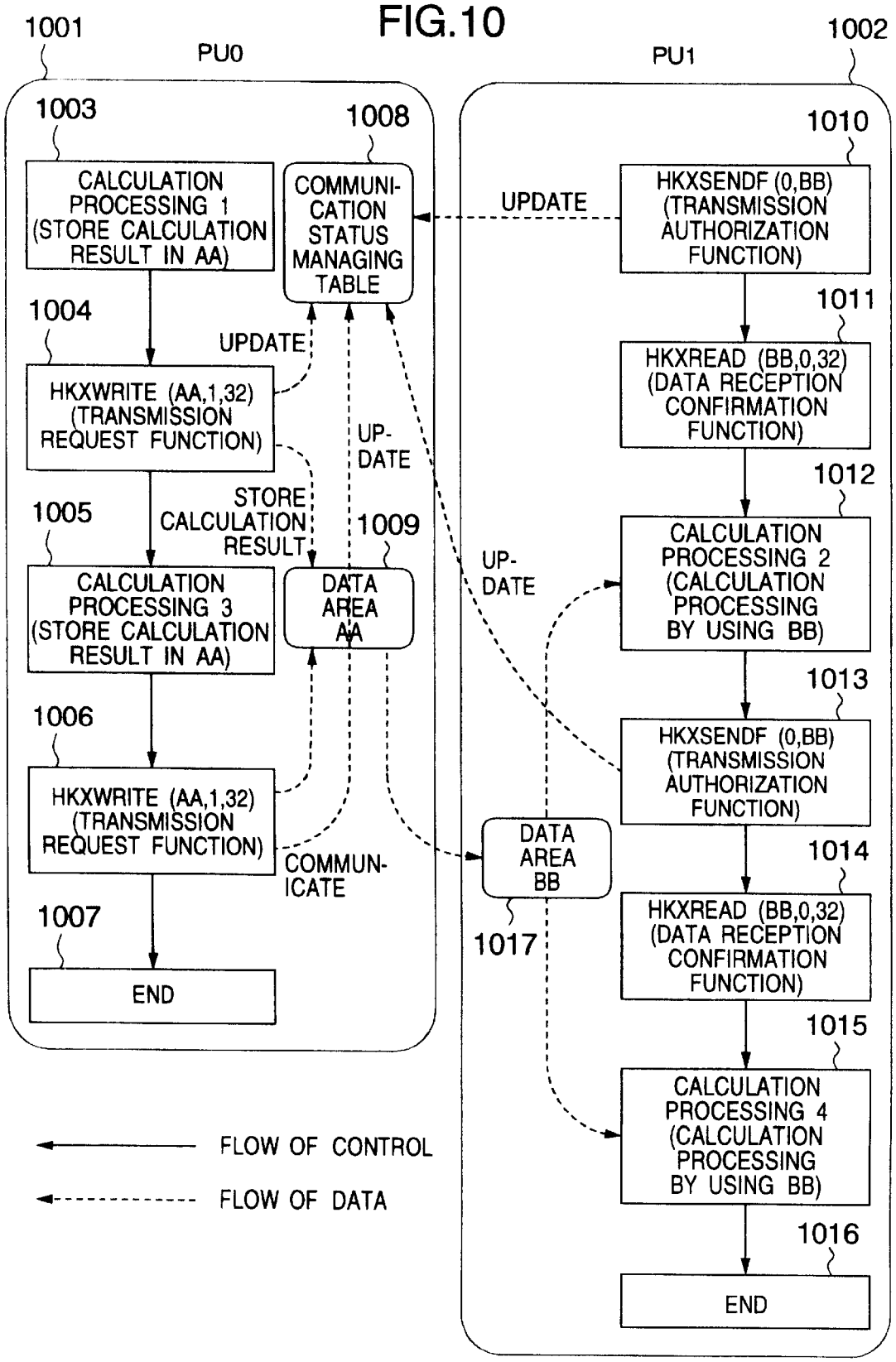

COMMUNICATION PROCESSING METHOD IN PARALLEL COMPUTER AND SYSTEM THEREFOR

BACKGROUND OF THE INVENTION

The present invention relates to processor-to-processor communication processing in a distributed memory parallel computer system and a communication processing method in the parallel computer for attaining high speed parallel program execution.

JP-A-5-46576 discloses a communication control system in which each of the processor units (hereinafter referred to as PUs) in the parallel computer system assigns a data transmission area on a memory and when data is written on that area, data is transmitted to a predetermined receiving PU identification code and a specified address of the memory.

The above prior art has the following problems.

The data transmitting PU cannot determine whether the destination PU issues a receive request or not because it does not know the status of the data receiving PU.

Accordingly, it is necessary to synchronize the transmitting PU with the receiving PU in the communication processing or secure an area in the receiving PU for temporarily buffering data transmitted from the transmitting PU and copy the data from the buffer area to the memory as required.

When the synchronization is made between the transmitting PU and the receiving PU, an interruption process by an operating system takes place and performance is lowered. In the approach of providing a data buffer area for the transmitting data in the receiving PU, a copy process from the buffer area to the memory is required and the copy time causes an overhead and performance is sacrificed.

SUMMARY OF THE INVENTION

In accordance with the present invention, the PU is provided with a communication status managing table so that the transmitting PU can recognize the status regarding whether or not the receiving PU is ready to receive the data. Thus, the data may be transmitted when it is required and no transmission data buffer is needed, and high speed communication between PUs is attained.

In order to achieve the above object, the PU is provided with the communication status managing table for managing the status as destination PUs to which the transmitting PU can transmit data, and the transmitting PU starts the transmission of the data after it has confirmed that the receiving PU is ready to receive the data, and the receiving PU updates the communication status management table of the transmitting PU to indicate that it is ready to receive the data.

By providing the communication status managing table for managing the information as to whether or not the PU can transmit the data to other PUs, the transmitting PU can determine whether the receiving PU is ready to receive the data or not and the data may be transmitted without the synchronization processing between PUs.

The receiving PU informs the transmitting PU of the readiness to receive the data so that it can receive the data directly in the memory without having the buffer area for the transmitted data.

Accordingly, it is not necessary to conduct the synchronization processing between PUs by the operating system and secure the buffer area for the received data and high speed PU-to-PU communication is attained without interruption processing or memory copy processing.

BRIEF DESCRIPTION OF THE DRAWINGS

FIG. 4 shows a format of a communication status managing table;

FIG. 10 shows an example of a program implementing the present invention.

DESCRIPTION OF THE PREFERRED EMBODIMENTS

An embodiment of the present invention is now explained in detail with reference to the drawings.

Figure 1:
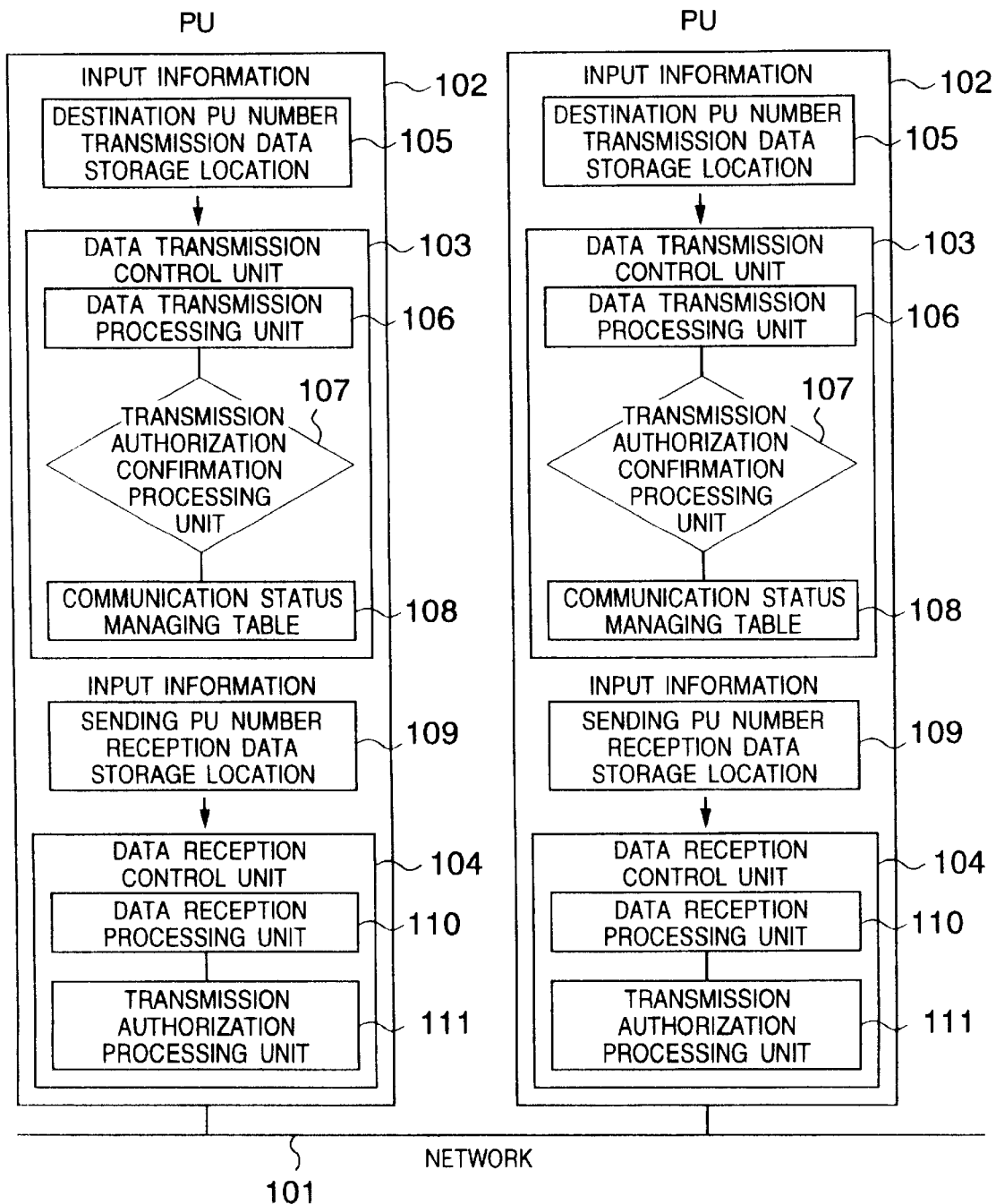
FIG. 1 shows a configuration of the present invention.

FIG. 1 shows a configuration of the present invention. A communication processing method of the present invention is implemented in a parallel computer system having a plurality of PUs 102 connected through a network 101, each of which comprises a data transmission control unit 103 for controlling a data transmission request for other PUs and a data reception control unit 104 for controlling a data receive request for other PUs.

The data transmission control unit 103 receives a destination PU number and a storage location of transmission data as input information 105. The data transmission control unit 103 comprises a transmission authorization confirmation processing unit 107 which refers a communication status managing table 108 which manages the presence or absence of data transmission authorization to other PUs and the storage location of the transmission data on the destination PU to determine whether the communication is permitted or not, and a data transmission processing unit 106 for transmitting the transmission data in accordance with the information of the communication status managing table 108.

The data reception control unit 104 receives the sender PU number and the storage location of the transmitted data as input information 109, and comprises a transmission authorization processing unit 111 for storing the transmission authorization and the storage position of the transmission data in the communication status managing table 108 of the sending PU in accordance with the input information 109 and a data reception processing unit 110 for confirming the data transmission.

Figure 2:
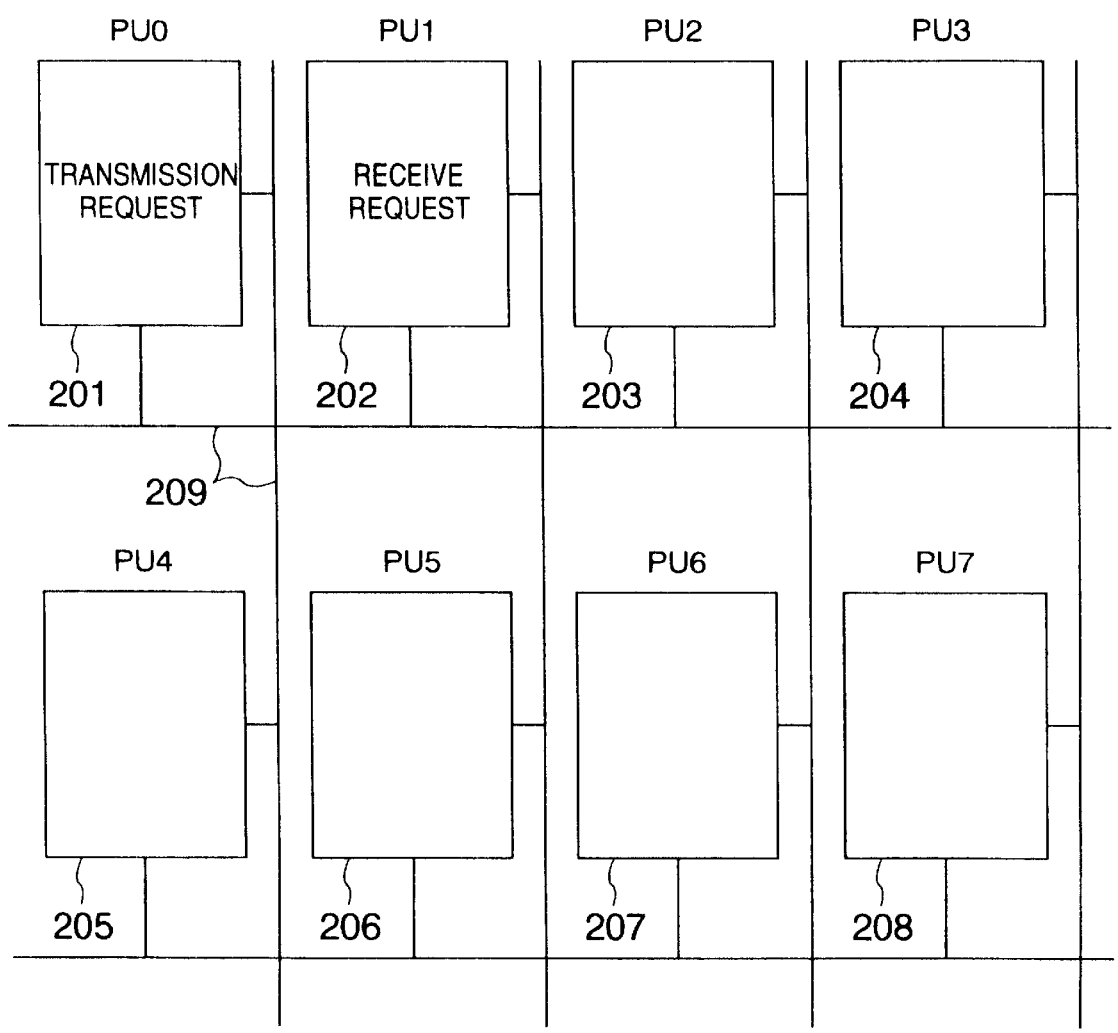
FIG. 2 shows a configuration of a parallel computer system.

FIG. 2 shows a parallel computer system having eight PUs PU0 (201)~PU7 (208) connected through a network 209 in which the PU0 201 issues a data transmission request to the PU1 202, and the PU1 202 issues a data reception request to the PU0 201.

Figure 3:
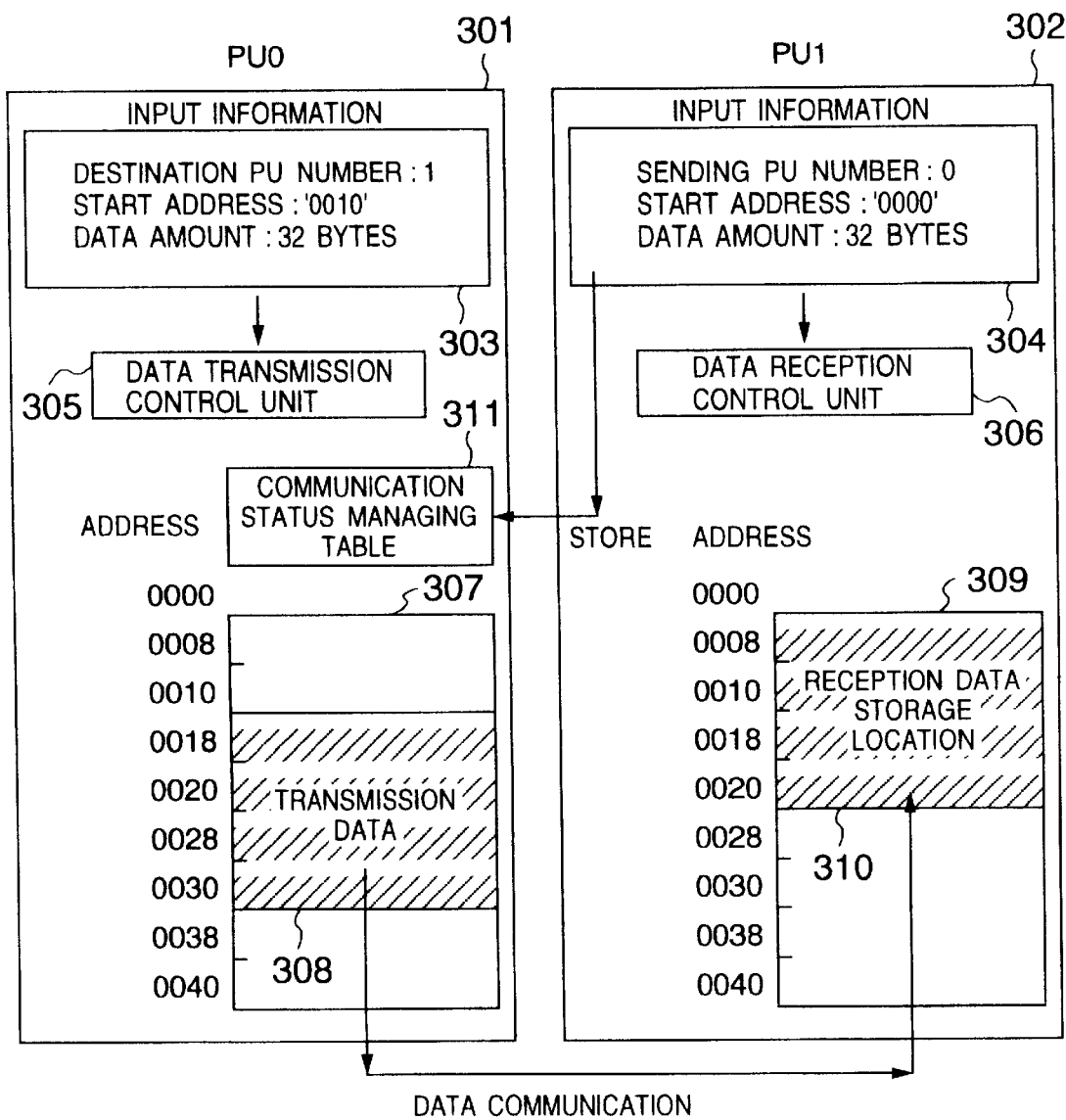
FIG. 3 shows the content of a transmission/reception process.

FIG. 3 shows a flow of process between PUs, a content of the data transmission of the PU0 301 and a content of the data reception of the PU1 302.

In the present embodiment, 32-bytes data starting from a start address '0010' in a data area 307 of the PU0 301 is transmitted to a 32-bytes area starting from a start address '0000' in a data area 309 of the PU1 302.

The PU0 301 supplies the destination PU number, the start address of the area in which the transmission data is stored and the data amount of the transmission data to the data transmission control unit 305 as the input information. The input information 303 indicates that the transmission data 308 is the 32-bytes data starting from the start address '0010' in the data area 307 of the PU0 301.

The PU1 302 supplies the sending PU number, the start address of the area in which the transmitted data is stored and the data amount to the data reception control unit 306 as the input information 304. The input information 304 indicates that the transmitted data is stored in the 32-bytes area starting from the start address '0000' in the data area 309 of the PU1 302.

A flow of the PU-to-PU communication processing is explained. When PU1 302 which is the data receiving PU is ready to receive the data, a start address in the input information 304 to the data reception control unit 306 is transmitted to the communication status managing table 311 of PU0 301 which is the transmitting PU and stored therein. The data transmission control unit 305 of PU0 301 which is the transmitting PU reads the data to be transmitted in accordance with the start address and the data amount in the input information 303 and transmits the data to the reception data storage location 310 of PU1 302 in accordance with the address stored in the communication status managing table 311.

FIG. 4 shows a format of the communication status managing table 401 of the PU. The communication status managing table 401 comprises a destination PU number 402, transmission authorization information 403 for indicating whether data transmission to the respective PUs is authorized or not and a destination storage location 404 for indicating a location of an area in which the transmission data is written for the PU which is authorized for the transmission. When the transmission authorization information status 405 is '0', it represents no authorization of data transmission, and when it is '1', it represents the authorization of transmission.

Figure 5:
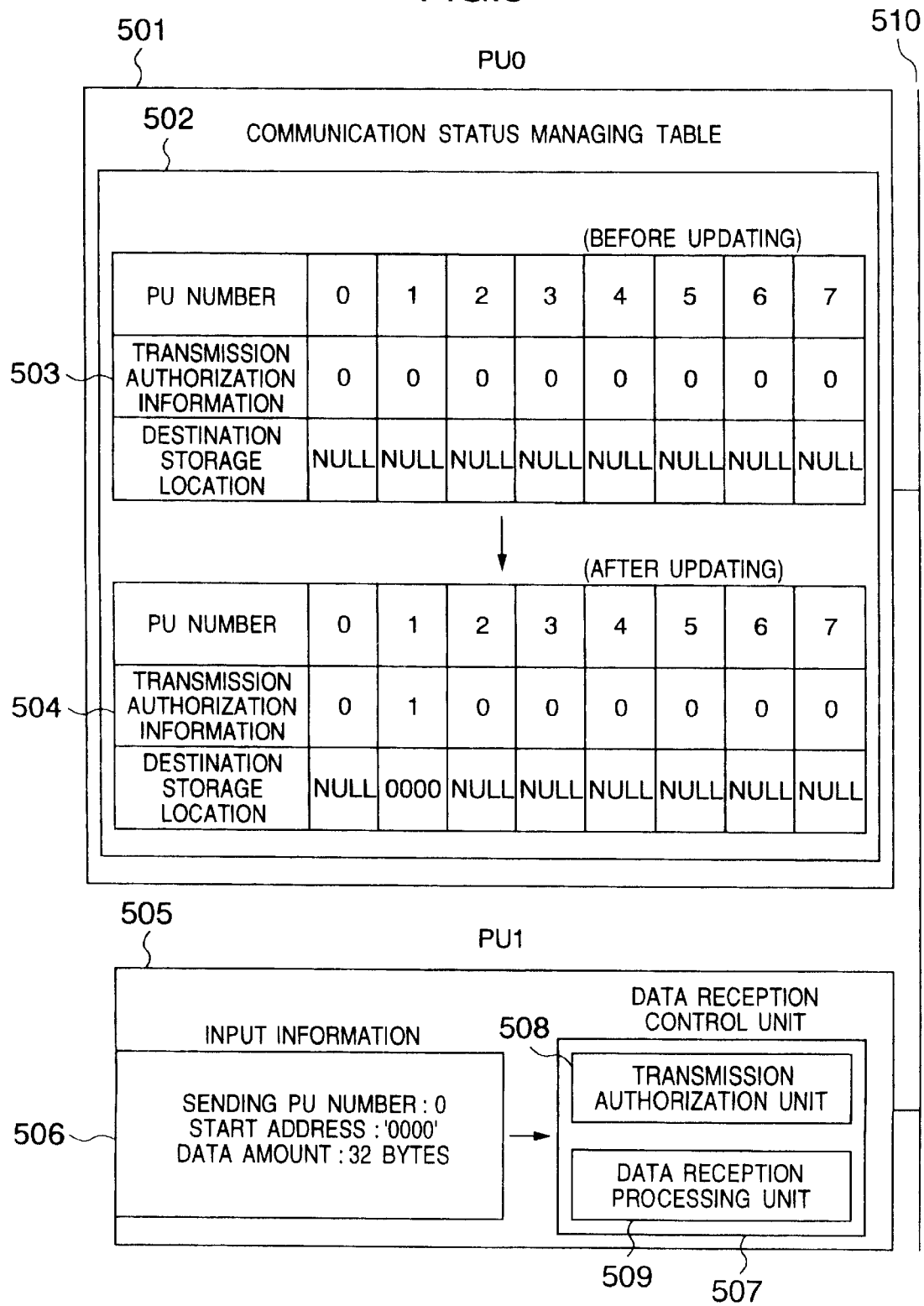
FIG. 5 shows a process of a data reception control unit of a receiving PU.

FIG. 5 shows a process of the data reception control unit 507 of the receiving PU.

The transmission authorization processing unit 508 applies the data transmission authorization to PU1 505 for PU0 501 which has the sending PU number designated by the input information 506. When the input information 506 on the data reception is inputted to the data reception control unit 507 of the PU1 505 which is the receiving PU, the transmission authorization processing unit 508 in the data reception control unit 507 updates the transmission authorization information in the column of the PU number 1 of the communication status managing table 502 of the PU0 501 indicated by the sending PU number of the input information 506 from '0' to '1' to impart the transmission authorization. The transmission authorization processing unit 508 updates the transmission authorization information and also writes in the destination storage location the start address in the input information 506 indicating the location in the PU1 505 at which the transmission data is to be stored.

The communication managing table 504 indicates the status after the data transmission authorization is imparted from PU1 505. The data reception processing unit 509 terminates the processing of the data reception control unit 507 after it confirms the transmission of the data from PU1 505.

Figure 6:
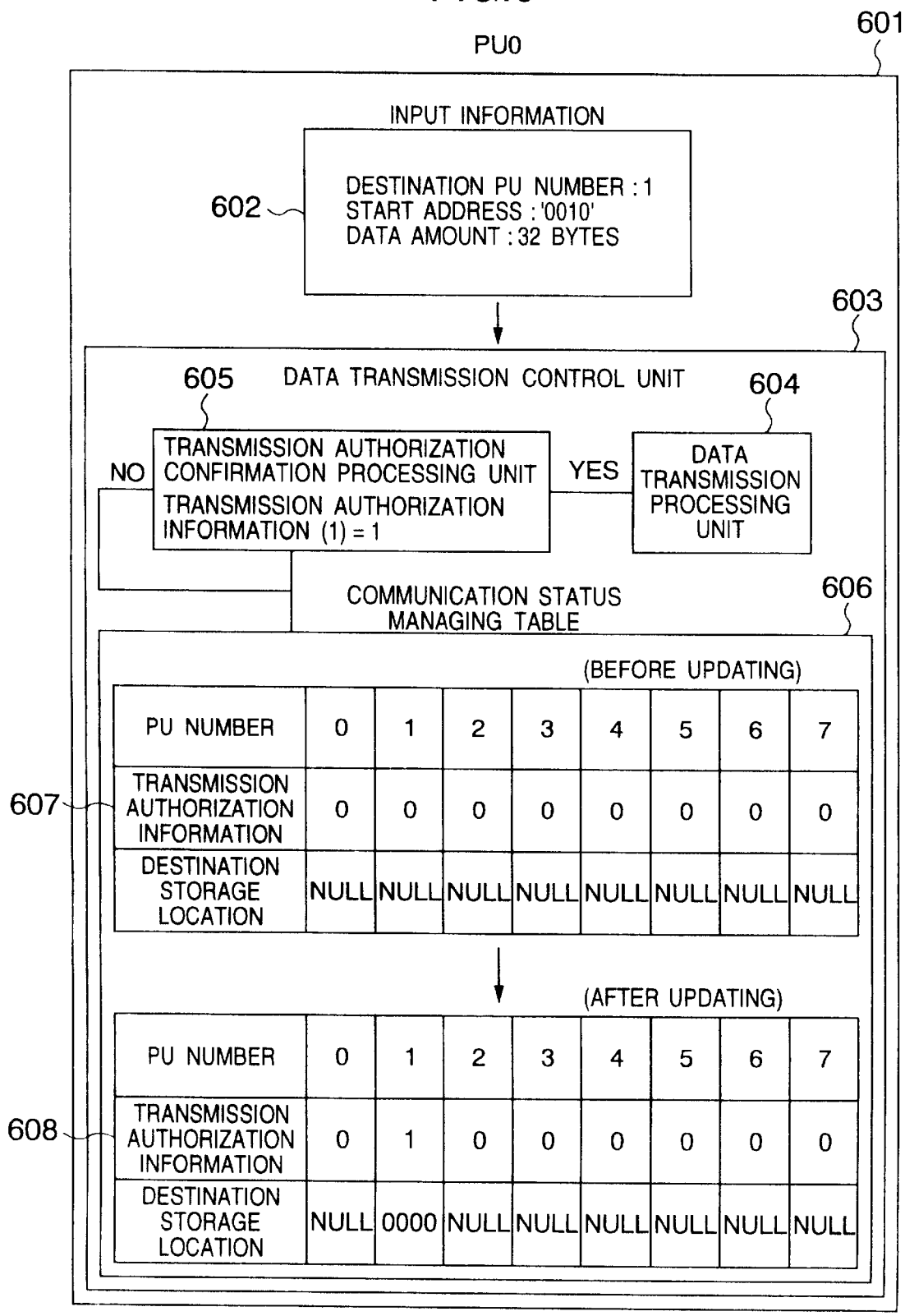
FIG. 6 shows a process of a data transmission control unit of a transmitting PU.

FIG. 6 shows processing of the data transmission control processing unit 603 of PU0 601 which is the transmitting PU. Since the destination PU number which is one of the input information 602 to the data transmission control processing unit 603 is 1, the transmission authorization processing unit 605 confirms whether the transmission authorization information in PU column 1 of the communication status managing table 606 is '1' or not. In the communication status managing table 607 for which the transmission authorization is not imparted from the PU1 which is the destination PU, the transmission information authorization information of the column of PU number 1 is '0'. Thus, the control is not transferred to the data transmission processing unit 604 but the transmission authorization processing unit 605 stands by without terminating the control until the transmission authorization is imparted from the PU1 which is the destination PU. In the communication status managing table 608 after the transmission authorization is imparted from the PU1, the transmission authorization processing unit 605 confirms that the transmission authorization information in the column of the PU number 1 of the communication status managing table 608 is '1' and then transfers the control to the data transmission control unit 604. The data transmission unit 604 transmits the 32-bytes data from the area '0010' designated by the start address of the input information 602 to the PU1 which is the destination PU. The data storage location in the destination PU1 is stored in the destination storage location of the communication status managing table 608.

Figure 7:
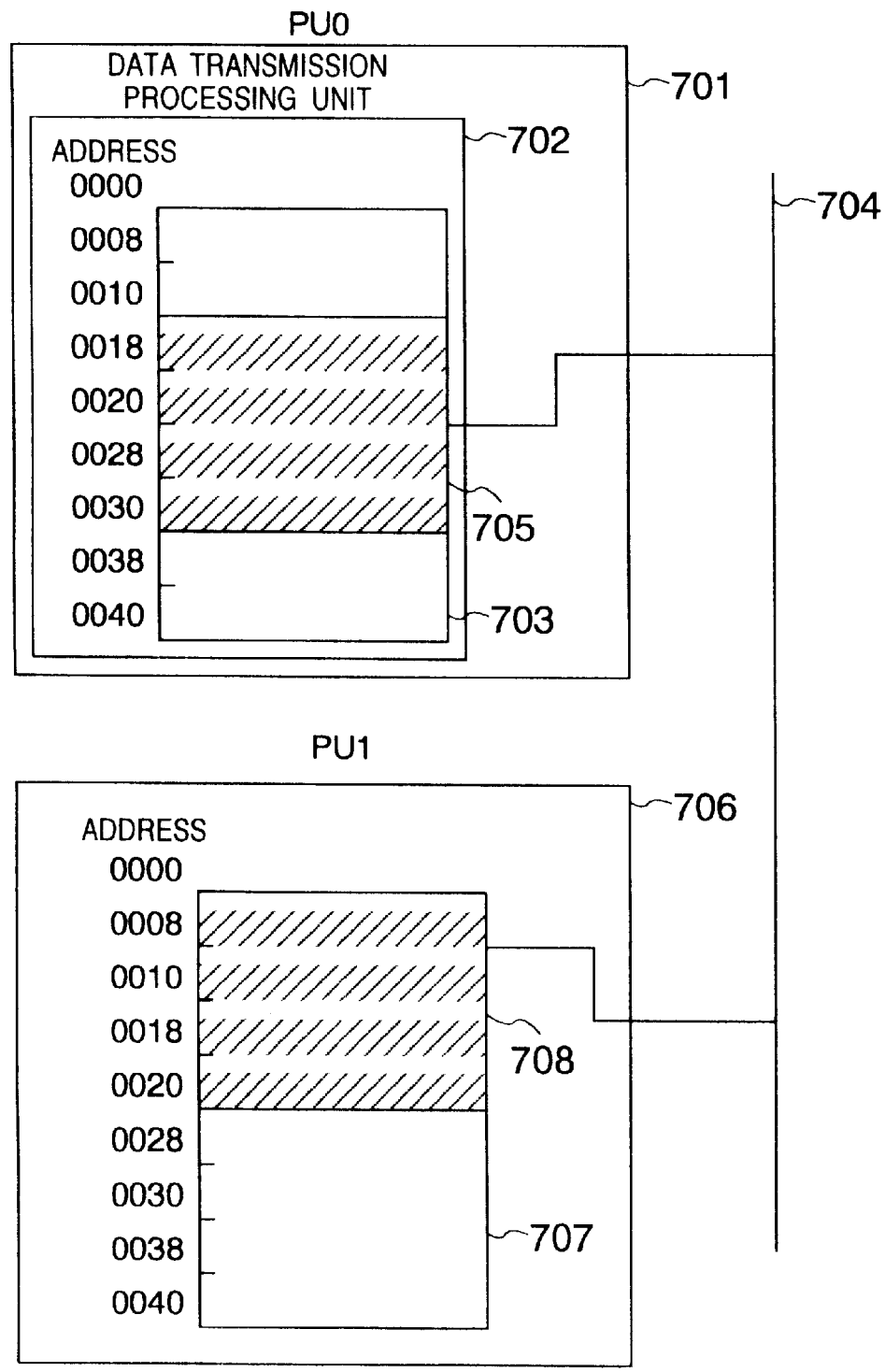
FIG. 7 shows an example of a data transmission processing.

FIG. 7 shows a data transmission processing method in the data transmission processing unit. The data transmission unit 702 of the PU0 701 transmits the 32-bytes data 705 starting from the start address '0010' in the data area 703 to the PU1 706 through the network 704 in accordance with the input information 602. The storage location in the PU1 706 is stored in accordance with the destination data storage location in the column of PU number 1 of the communication status managing table 608. In FIG. 7, the data is stored in the 32-bytes area starting from the start address '0000' of the data area 707 of the PU1 706.

When the communication processing of the present embodiment is implemented by the prior art, the PU0 701 which is the data transmitting PU cannot determine whether it may transmit the data or not because it does not know the status as to whether PU1 706 which is the data receiving PU requests the data reception or not.

For example, if the data area 708 of PU1 706 to which PU0 701 attempts to transmit the data is being used by the PU1 706 for calculation, the result of calculation mat be wrong if the data is transmitted from PU0 701. Accordingly, in the prior art, the synchronization processing provided by the hardware and the operating system is utilized to synchronize the status in which the transmitting PU issues a data transmission request with the status in which the receiving PU issues a data reception request to conduct the communication processing.

In the present invention, synchronization processing is not necessary because the data reception control unit 306 updates the communication status managing table 311 of the PU0 301 which is the data transmitting PU to inform that the data receiving PU1 302 has issued the data receive request.

Figure 8:
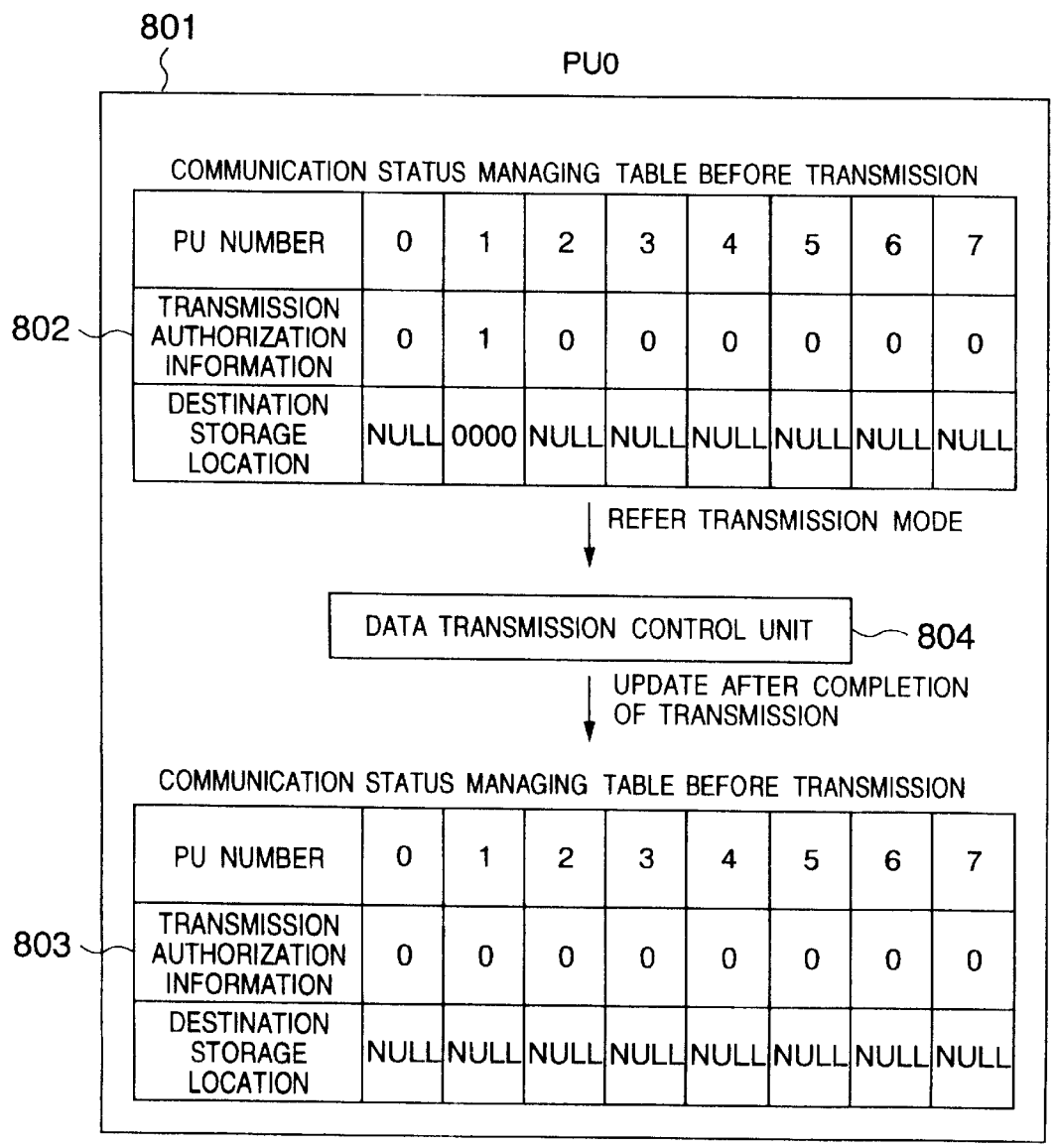
FIG. 8 shows a communication status managing table.

FIG. 8 shows the communication status managing table after the data transmission.

The data transmission control unit 804 refers the transmission status managing table 802 storing the data transmission status, transmits the data to the PU1, initializes the transmission authorization information and the destination storage location in the column of PU number 1 in the communication status managing table 802 to render the communication status managing table 803 to have no transmission authorization to the PU1.

Figure 9:
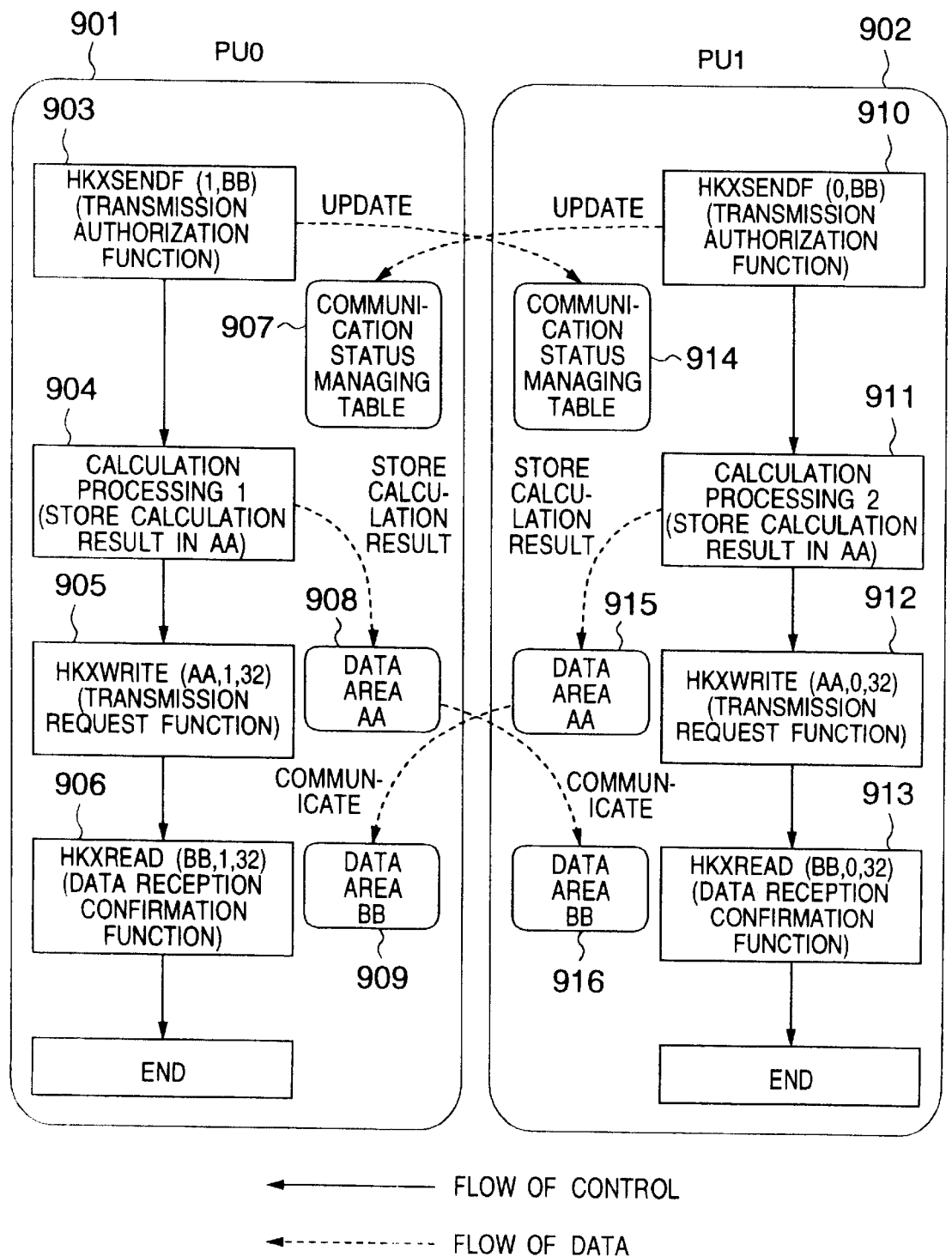
FIG. 9 shows an example of a program implementing the present invention.

FIG. 9 shows an example of a parallel program prepared by using the communication processing method of the present invention.

The PU0 901 stores a result of a calculation processing 1 (904) in a data area AA 908 secured on a memory of the PU0 901 and transmits the data stored in the data area AA of the PU0 to a data area BB 916 secured on a memory of PU1 902. The PU1 902 stores a result of a calculation processing 2 (911) in a data area AA 915 secured on the memory of the PU1 902 and transmits it to a data area BB 909 secured on the memory of PU0 901.

The PU0 901 takes the reception of the result of the calculation processing 2 911 in the PU1 902 to data area BB 909 into consideration and updates the communication status managing table 914 of PU1 902 by using a transmission authorization function HKXSENDF 903 and stores the transmission authorization to the data area BB 909 and the start address of the data area BB 909 of PU0 901 in which the data is stored in the communication status managing table 914 of the PU1 902. After it imparts the transmission authorization, it executes the calculation processing 1 904 and stores the calculation result in the data area AA 908. The data stored in the data area AA 908 is transmitted to PU1 902 by issuing a transmission request function HKXWRITE 905 to the PU1 902. The transmission request function HKXWRITE 905 refers the content of the communication status managing table 907 of the PU0 901 to confirm that the transmission authorization to the PU1 902 has been imparted and transmits the data to the data area BB 916. After the transmission, it issues a data reception confirms function HKXREAD 906, confirm the transmission of the data from the PU1 902 to the data area BB 909, and if the data has been transmitted, it terminates the process.

The PU1 902 takes the reception of the result of the calculation processing 1 904 in the PU0 901 to the data area BB 919 into consideration, updates the communication status managing table 907 of the PU0 901 by using a transmission authorization function HKFSENDF 910 before entering into the calculation processing and stores the transmission authorization to the data area BB 916 and the start address of the data area BB 916 of the PU1 902 which is the data destination PU in the communication status managing table 907 of the PU0 901. After it imparts the transmission authorization, it executes the calculation processing 2 911 and stores the calculation result in the data area AA 915. The data stored in the data area AA 915 is transmitted to PU0 901 by issuing the transmission request function HKXWRITE 912 to PU0 901.

The transmission request function HKXWRITE 912 refers the content of the communication status managing table 914 of PU1 902 to confirm that the transmission authorization to PU0 901 has been imparted, and transmits the data to the data area BB 909 of PU0 901 which is the destination PU designated in the communication status managing table 914. After the transmission, it issues the data reception confirmation function HKXREAD 913, confirms whether the data has been transferred from PU0 901 to the data area BB 916, and if the data has been transmitted, it terminates the processing.

FIG. 10 also shows an example of the parallel program prepared by utilizing the communication processing system of the present invention.

The PU0 1001 stores a result of a calculation processing 1 1003 in a data area AA 1009 secured on a memory of PU0 1001 and transmits it to a data area BB 1017 secured on a memory of the PU1 1002 by a transmission request function HKXWRITE 1004. The PU0 1001 transmits the data to PU1 1002, updates the data area AA 1009 by a calculation processing 3 1005, transmits it to the data area BB 1017 secured on the memory of PU1 1002 by the transmission request function HKXWRITE 1006 and terminates the processing.

The PU1 1002 updates the communication status managing table 1008 of the PU0 1001 by using the transmission authorization function HKXSENDF 1010 in order to receive the data from PU0 1001 to the data area BB 1017 and stores transmission authorization of the data to PU1 1002 and the start address of the data area BB 1017 in which the data is stored in the communication status managing table 1008 of the PU0 901.

The transmission request function 1004 of PU0 1001 confirms the content of the communication status managing table 1008 and confirms the updating to the status shown by 608 in FIG. 6 by the transmission authorization function HKXSENDF 1010 issued by the PU1 1002 and transmits the data to the data area BB 1017 of PU1 1002.

The PU0 1001 transmits the data to PU1 1002 by the transmission request function HKXWRITE 1004, updates the communication status managing table 1008 of PU0 1001 from the status of 802 in FIG. 8 to the status of 803 in FIG. 8 to invalidate the transmission authorization to PU1 1002 of PU0 1001 to make the data transmission from the PU0 1001 to the PU1 1002 inactive.

The PU1 1002 confirms the transmission of the data from PU0 1001 to the data area BB 1017 by the data reception confirmation function HKXREAD 1011 and uses the data stored in the data area BB 1017 for the calculation processing 2 1012. After the completion of the calculation processing 2 1012, the communication status managing table 1008 of PU0 1001 is updated by the transmission status managing function HKXSENDF 1013 so that the result of calculation of the calculation processing 3 1005 stored in the data area AA 1009 of the PU0 1001 is transmitted to the data area 1017 of PU1 1002, and the transmission authorization of the data to PU1 1002 and the start address of the data area BB 1017 in which the data is stored are stored in the communication status managing table 1008 of PU0 901.

After the transmission request function HKXWRITE 1006 of the PU0 1001 has confirmed that the communication status managing table 1008 has been updated to the status shown by 608 in FIG. 6 by the transmission authorization function HKXSENDF 1013 issued by the PU1 1002, it transmits the data stored in the data area AA 1009 to PU1 1002.

The PU1 1002 confirms that the data has been transmitted from PU0 1001 to the data area BB 1017 of PU1 1002 by the data reception function HKXREAD 1014, uses the data stored in the data area BB 1017 for the calculation processing 4 and terminates the processing.

In the prior art, since the transmission authorization functions 1010 and 1013 are not provided, it may happen that the next data is stored in the data area BB 1017 of PU1 1002 by the transmission of second data of PU0 1001 during the use of the data stored in data area BB 1017 of the PU1 1002. Thus, the result of the calculation processing 2 1012 may be wrong.

In the prior art, in order to prevent the result from being wrong, it is necessary to synchronize for each data transmission and reception by using the PU-to-PU synchronization provided by the hardware and the operating system. In this case, an interruption to the operating system occurs for each communication processing and the performance is lowered.

In the communication processing method of the present invention, since the transmitting PU updates the communication status managing table from the status 802 of FIG. 8 to the status 803 for each data transmission and invalidates the data transmission authorization, there is no risk of unduly transmitting the data to result in a wrong result. Further, since the receiving PU imparts the transmission authorization to the transmitting PU by updating the communication status managing table of the transmitting PU to the status 802 of FIG. 8 when it requests the data reception, it is not necessary to use the PU-to-PU synchronization processing provided by the hardware and the operating system.

In accordance with the present invention, the synchronization control between the transmitting PU and the receiving PU is not necessary in the PU-to-PU communication in the parallel computer having independent memories, and the data transmission and reception may be attained directly to and from the requested location. Thus, the high speed communication processing without the interruption of the operating system and the memory copy processing is attained.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A communication processing method in a parallel computer system having a plurality of processor units connected through a network, wherein each of said processor units includes a memory and a flag in said memory, said method comprising the steps of:

setting the flag of a transmitting one of said processor units by a receiving one of said processor units indicating a ready state of said receiving one of said processor units for receiving data from said transmitting one of said processor units;

confirming the set flag indicating the ready state of said receiving one of said processor units by said transmitting one of said processor units;

transmitting the data from said transmitting one of said processor units to said receiving one of said processor units; and indicating, by the flag in said transmitting one of said processor units, a non-ready state of said receiving one of said processor units for receiving other data from said transmitting one of said processor units.

2. A communication processing method in a parallel computer system having a plurality of processor units connected through a network, wherein each of said processor units includes a memory, said method comprising the steps of:

writing, in a transmitting one of said processor units, location information indicating where said receiving one of said processor units stores data to be transmitted from said transmitting one of said processor units thereby indicating a ready state for receiving data in said receiving one of said processor units from said transmitting one of said processor units;

confirming the ready state of said receiving one of said processor units by said transmitting one of said processor units;

transmitting the data from said transmitting one of said processor units to said receiving one of said processor units;

storing the data to a location indicated by the location information in said receiving one of said processor units; and indicating, by said transmitting one of said processor units, a non-ready state of said receiving one of said processor units for receiving other data from said transmitting one of said processor units.

3. A communication processing method in a parallel computer system having a plurality of processor units connected through a network, wherein each of said processor units includes a memory having a flag therein indicating a ready/not ready state of receiving ones of said processor units and location information indicating an area in said receiving ones of said processor units to which data is to be transmitted, said method comprising the steps of:

setting a flag of a transmitting one of said processor units indicating corresponding location information where said receiving one of said processor units stores the data to be transmitted by a transmitting one of said processor units and a ready state for receiving data in said receiving one of said processor units from said transmitting one of said processor units;

confirming the set flag indicating the ready state of said receiving one of said processor units by said transmitting one of said processor units;

transmitting the data from said transmitting one of said processor units to said receiving one of said processor units; and indicating, by the flag in said transmitting one of said processor units, a non-ready state of said receiving one of said processor units for receiving other data from said transmitting one of said processor units.

4. A parallel computer system, comprising:

a plurality of processor units connected through a network, wherein each of said processor units includes a memory having a flag therein;

wherein a receiving one of said processor units indicates a ready state for receiving data to a transmitting one of said processor units by setting the flag of said transmitting one of said processor units to a transmission ready state, said receiving one of said processor units confirming the set flag indicating the ready state thereof by said transmitting one of said processor units; and wherein said transmitting one of said processor units transmits the data to said receiving one of said processor units, and after completion of the data transmission, indicates, by the flag in said transmitting one of said processor units, a non-ready state of said receiving one of said processor units for receiving other data from said transmitting one of said processor units.

5. A parallel computer system, comprising:

a plurality of processor units connected through a network, wherein each of said processor units includes an independent memory for storing location information indicating an area in respective other ones of said processor units in said network to which data is to be transmitted;

wherein a receiving one of said processor units indicates a ready state for receiving data to a transmitting one of said processor units by writing, location information indicating where said receiving one of said processor units stores the data; and wherein said transmitting one of said processor unit transmits the data after confirming that said receiving one of said processor units has stored the location information indicating the data transmission location, and transmits the data to a location indicated by the location information.

6. A parallel computer system, comprising:

a plurality of processor units connected through a network, wherein each of said processor units includes an independent memory, a flag indicating respective other ones of said processor units in said network to which data transmission is or is not authorized and location information indicating an area in respective other ones of said processor units in said network to which data is to be transmitted, wherein a receiving one of said processor units indicates a ready state for receiving data to a transmitting one of said processor units by setting said flag of said transmitting one of said processor units to a transmission authorization status and writing corresponding location information regarding where said receiving one of said processor units stores the data; and wherein said transmitting one of said processor units transmits the data after confirming that said receiving one of said processor units has updated the flag of said transmitting one of said processor units to the transmission authorization status and stored the location information, and after completion of transmission, sets the flag to a transmission non-authorization status.

* * * * *